US012651840B2

(12) United States Patent
Huang et al.

(10) Patent No.: US 12,651,840 B2
(45) Date of Patent: Jun. 9, 2026

(54) ANTENNA DEVICE

(71) Applicants: INVENTEC (PUDONG) TECHNOLOGY CORPORATION, Shanghai (CN); INVENTEC CORPORATION, Taipei City (TW)

(72) Inventors: Shi-Wei Huang, Taipei City (TW); Jin-Yu Chang, Taipei City (TW); Yu Shu Tai, Taipei City (TW); Hsin-Hung Lin, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 14 days.

(21) Appl. No.: 18/981,899

(22) Filed: Dec. 16, 2024

(65) Prior Publication Data

US 2026/0074424 A1 Mar. 12, 2026

(30) Foreign Application Priority Data

Sep. 12, 2024 (CN) ......................... 202411281547.3

(51) Int. Cl.
*H01Q 9/04* (2006.01)

(52) U.S. Cl.
CPC ................................. *H01Q 9/0414* (2013.01)

(58) Field of Classification Search
CPC ................... H01Q 1/38; H01Q 9/0414; H01Q 5/378–392; H01Q 9/0407; H01Q 21/06–08
See application file for complete search history.

(56) References Cited

U.S. PATENT DOCUMENTS

| | | | | |
|---|---|---|---|---|
| 9,172,145 | B2 * | 10/2015 | Puzella | H01Q 21/0025 |
| 11,183,771 | B2 * | 11/2021 | Yokokawa | H01Q 3/26 |
| 12,334,637 | B2 * | 6/2025 | Cheah | H01Q 1/523 |
| 12,374,809 | B2 * | 7/2025 | Zhang | H01Q 21/0075 |

* cited by examiner

*Primary Examiner* — Hasan Islam
(74) *Attorney, Agent, or Firm* — Maschoff Brennan

(57) ABSTRACT

An antenna device includes a first substrate, a second substrate, an excitation component, rectangular radiation components, circular radiation components and an impedance matching component. The first substrate has a first bottom surface and a first top surface facing away from each other. The second substrate is stacked on the first substrate and has a second bottom surface and a second top surface facing away from each other. The second bottom surface is connected to the first top surface. The excitation component is disposed on the first bottom surface. The rectangular radiation components and the circular radiation components are disposed on the second top surface. The rectangular radiation components surround the circular radiation components. The impedance matching component is disposed on the second top surface. The circular radiation components surround the impedance matching component. The circular radiation components are spaced apart from the impedance matching component by identical distances.

10 Claims, 7 Drawing Sheets

10

ANTENNA DEVICE

CROSS-REFERENCE TO RELATED APPLICATIONS

This non-provisional application claims priority under 35 U.S. C. § 119(a) on Patent Application No(s). 202411281547.3 filed in China, on Sep. 12, 2024, the entire contents of which are hereby incorporated by reference.

BACKGROUND OF THE INVENTION

Technical Field of the Invention

The invention relates to an antenna device, more particularly to an antenna device including an excitation component, radiation components and an impedance matching component.

Description of the Related Art

With the advancement of mobile communication technology, various electronic devices are evolving to offer more diversified functions, become lighter and thinner, and achieve faster and more efficient data transmission. In particular, mobile communication technology is expected to enter the WiFi 7 and 6G era, meeting various life applications and business requirements that WiFi 6E and 5G have not fulfilled.

However, the return losses of the conventional antenna devices are still too high to meet communication requirements of WiFi 7 and 6G. Therefore, improving the communication quality of the antenna device in the frequency band of WiFi 7 and 6G technology is one of the key issues that researchers need to address.

SUMMARY OF THE INVENTION

The invention provides an antenna device for improving the communication quality of the antenna device in the frequency band of WiFi 7 and 6G technology.

One embodiment of the invention provides an antenna device including a first substrate, a second substrate, an excitation component, a plurality of rectangular radiation components, a plurality of circular radiation components and an impedance matching component. The first substrate has a first bottom surface and a first top surface facing away from each other. The second substrate is stacked on the first substrate and has a second bottom surface and a second top surface facing away from each other. The second bottom surface is connected to the first top surface. The excitation component is disposed on the first bottom surface and includes a tuning fork-shaped excitation body, a bar-shaped excitation body and two fence-shaped excitation bodies. The tuning fork-shaped excitation body includes a handle portion and a bifurcation portion. The handle portion is connected to a side the bifurcation portion. The bar-shaped excitation body and the two fence-shaped excitation bodies are connected to a side of the bifurcation portion away from the handle portion. The bifurcation portion surrounds the bar-shaped excitation body and the two fence-shaped excitation bodies. The two fence-shaped excitation bodies are respectively located on different sides of the bar-shaped excitation body. The plurality of rectangular radiation components are disposed on the second top surface and arranged in an array. The plurality of circular radiation components are disposed on the second top surface and arranged in an array. The plurality of rectangular radiation components surround the plurality of circular radiation components. The impedance matching component is disposed on the second top surface. The plurality of circular radiation components surround the impedance matching component. The plurality of circular radiation components are spaced apart from the impedance matching component by identical distances.

According to the antenna device disclosed in the above embodiment, the bifurcation portion surrounds the bar-shaped excitation body and the fence-shaped excitation bodies, the fence-shaped excitation bodies are respectively located on different sides of the bar-shaped excitation body, the rectangular radiation components surround the circular radiation components, the circular radiation components surround the impedance matching component, and the circular radiation components are spaced apart from the impedance matching component by identical distances, such that the antenna device can have or correspond to a frequency band covering the frequency band of WiFi 7 and 6G, and the return loss of this frequency band can be reduced so as to meet communication requirements of WiFi 7 and 6G. Accordingly, the communication quality of the antenna device in the frequency band of WiFi 7 and 6G technology can be improved.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
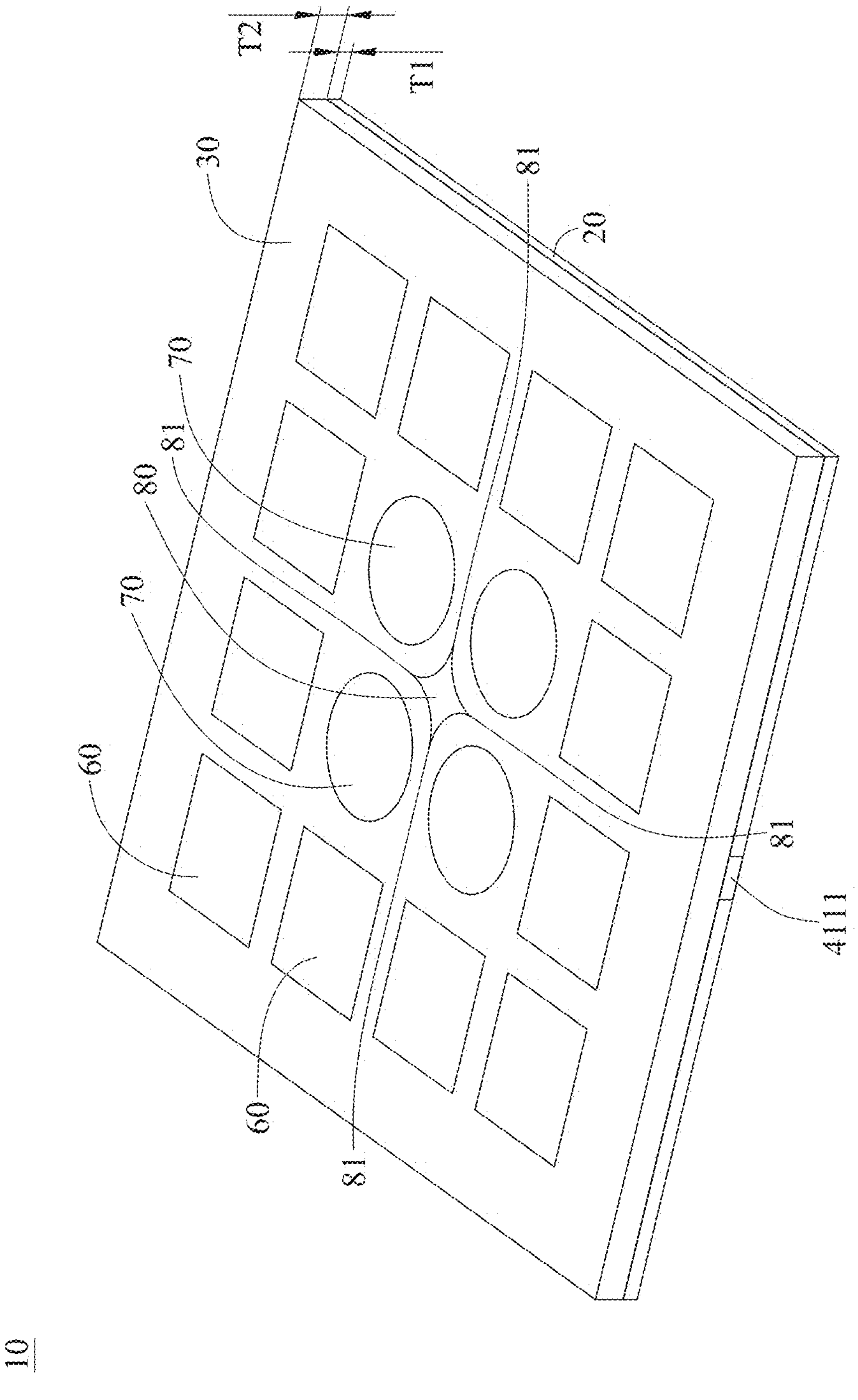
FIG. 1 is a perspective view of an antenna device in accordance with an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
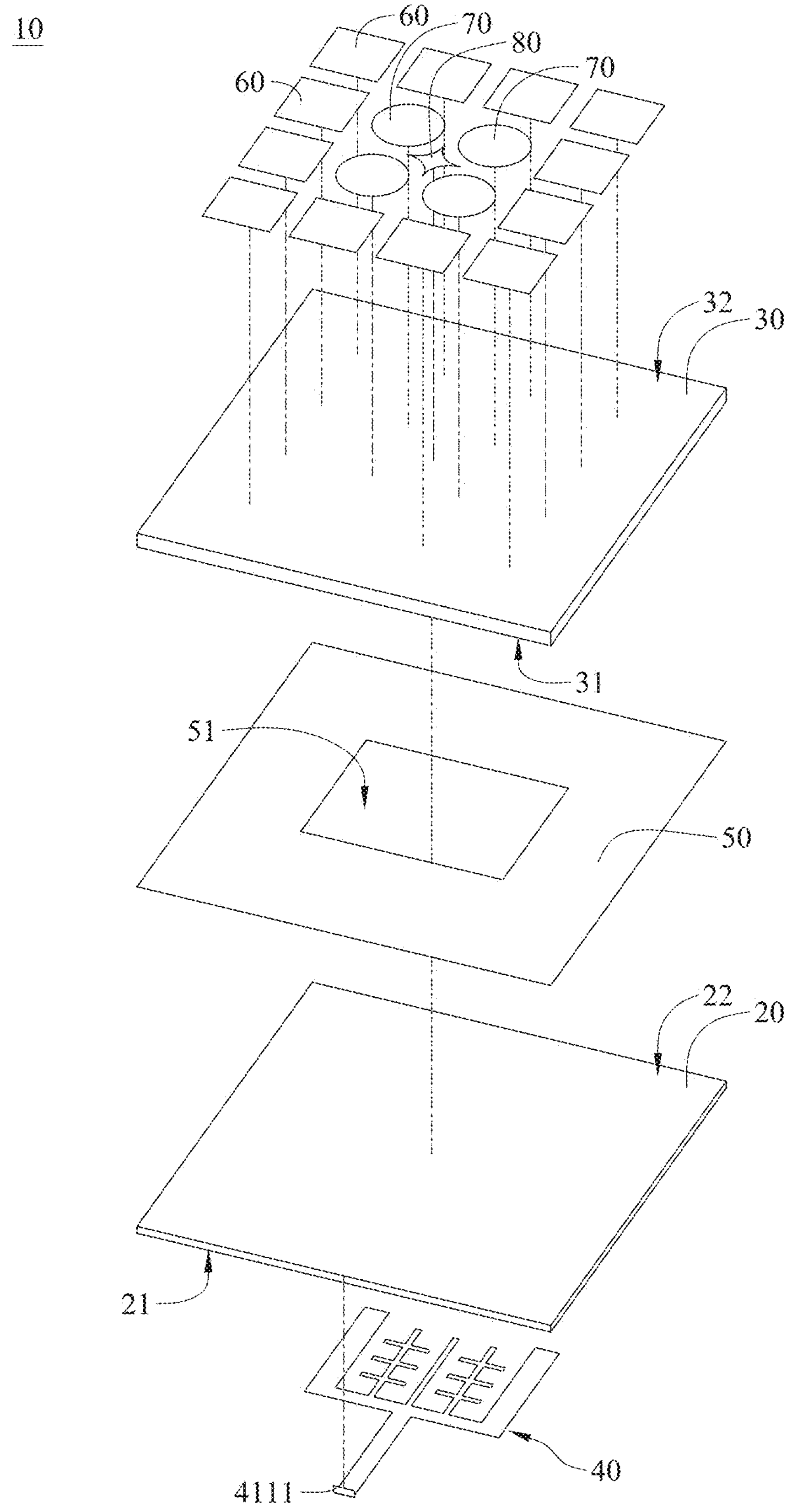
FIG. 2 is an exploded view of the antenna device in FIG. 1.

Please refer to FIG. 1 and FIG. 2, where FIG. 1 is a perspective view of an antenna device 10 in accordance with an embodiment of the invention, and FIG. 2 is an exploded view of the antenna device 10 in FIG. 1.

In this embodiment, the antenna device 10 is adapted for a frequency band of WiFi 7 (including a frequency band ranging from 2.402 GHz to 2.494 GHz and a frequency band ranging from 5.03 GHz to 7.125 GHz) and a frequency band of Ku-band in 6G (ranging from 10.7 GHz to 18 GHz), and includes a first substrate 20, a second substrate 30, an excitation component 40, a signal coupling component 50, a plurality of rectangular radiation components 60, a plurality of circular radiation components 70 and an impedance matching component 80.

The first substrate 20 and the second substrate 30 are made of, for example, glass fiber material. The first substrate 20 has a first bottom surface 21 and a first top surface 22 facing away from each other. The second substrate 30 is stacked on the first substrate 20, and has a second bottom surface 31 and a second top surface 32 facing away from each other. The second bottom surface 31 is connected to the first top surface 22. A thickness T1 of the first substrate 20 is, for example, 0.4 millimeters, and a thickness T2 of the second substrate 30 is, for example, 1.6 millimeters.

Figure 3:
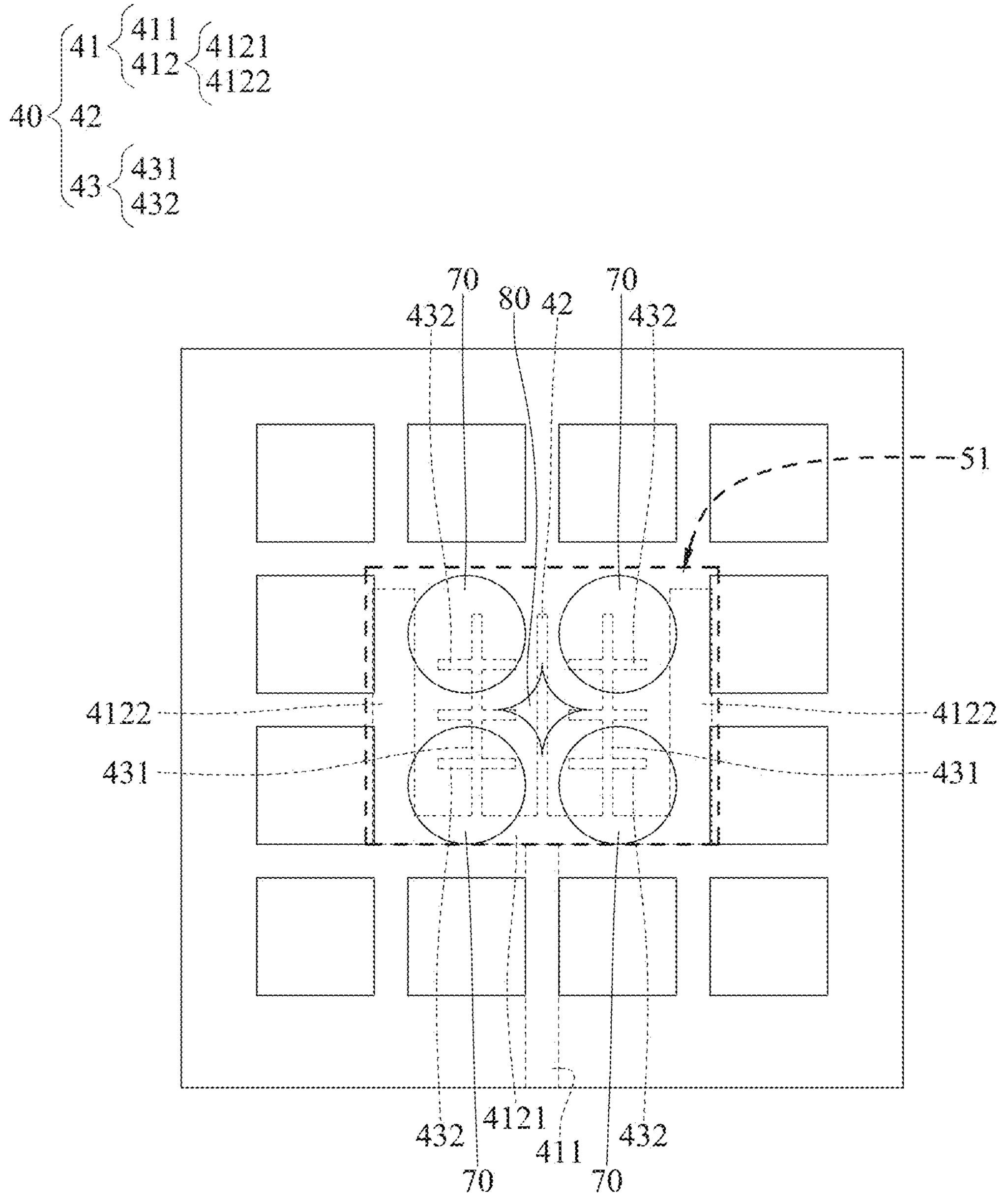
FIG. 3 is a plane view of the antenna device in FIG. 1.
Figure 4:
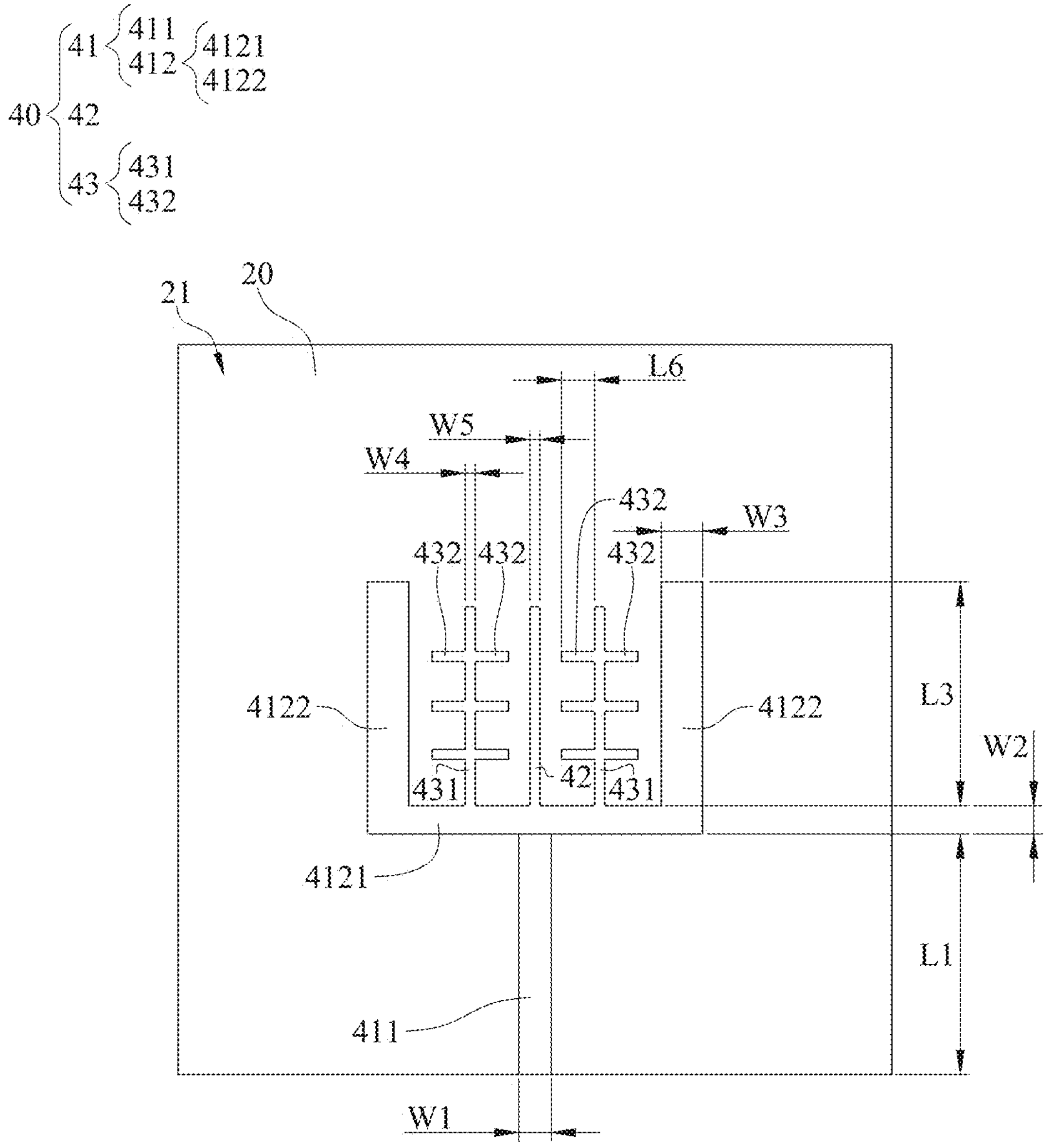
FIG. 4 is a plane view of a first bottom surface of the antenna device in FIG. 1.
Figure 5:
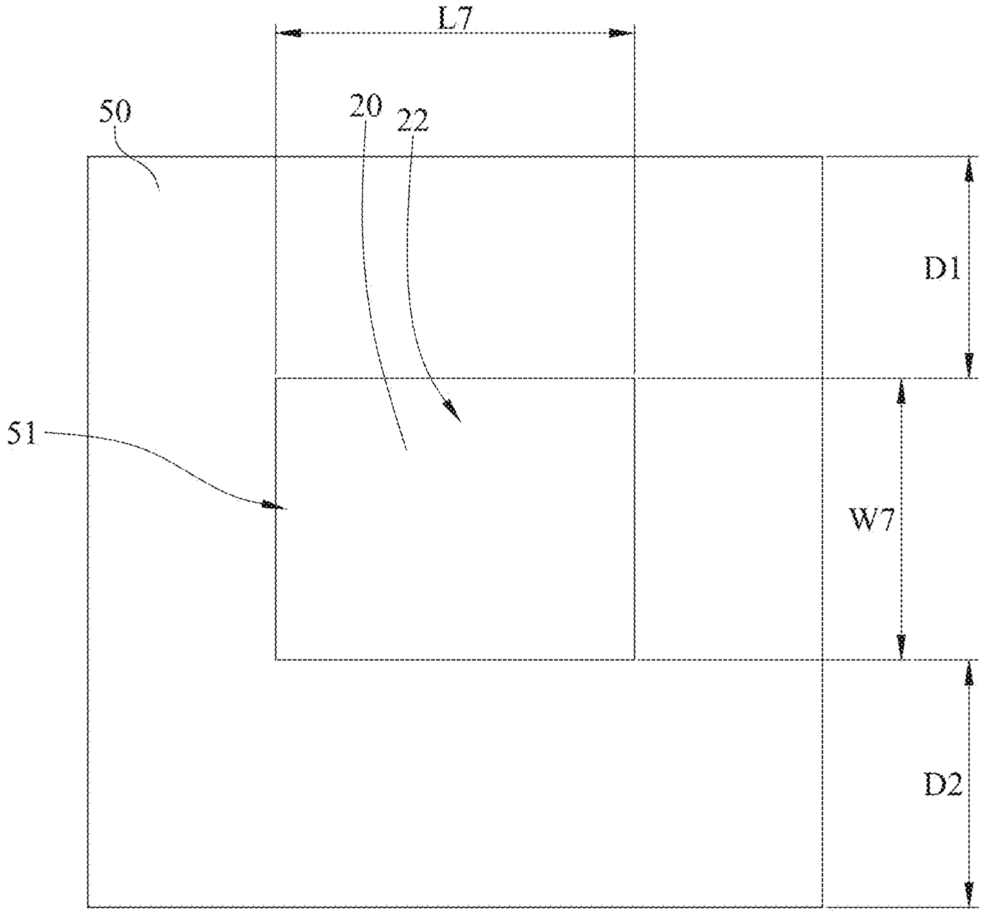
FIG. 5 is a plane view of a first top surface of the antenna device in FIG. 1.
Figure 6:
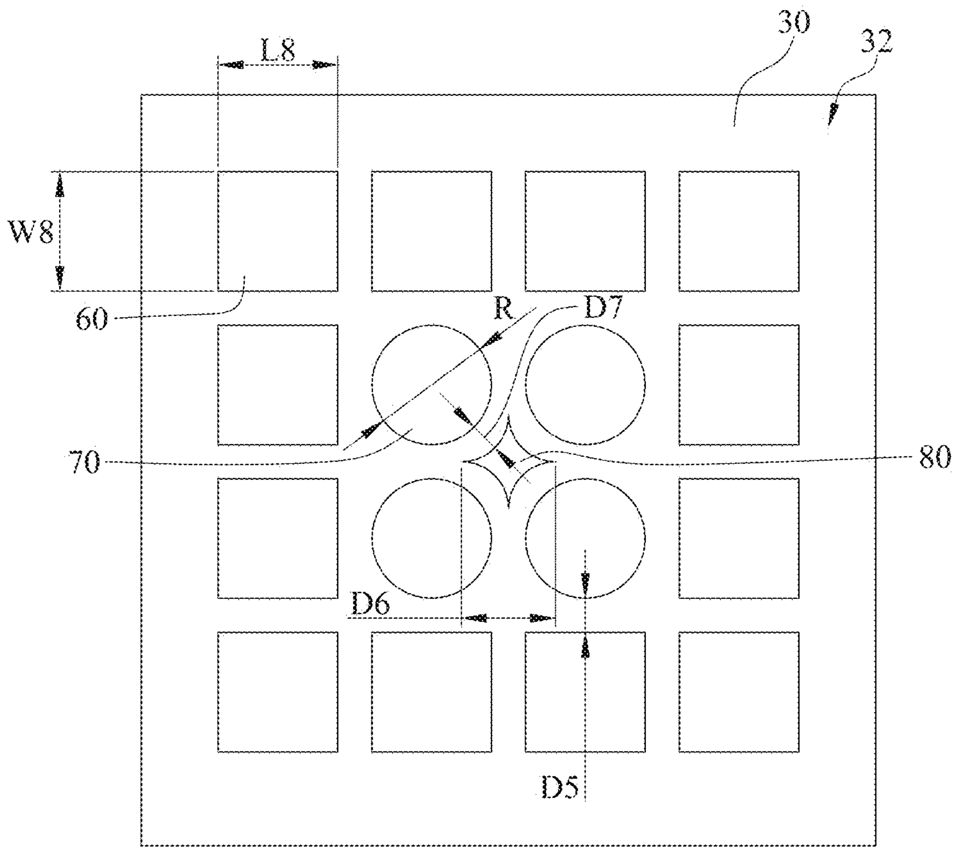
FIG. 6 is a plane view of a second top surface of the antenna device in FIG. 1.

Please further refer to FIG. 3 to FIG. 6 together with FIG. 1 and FIG. 2, where FIG. 3 is a plane view of the antenna device 10 in FIG. 1, FIG. 4 is a plane view of the first bottom surface 21 of the antenna device 10 in FIG. 1, FIG. 5 is a plane view of the first top surface 22 of the antenna device 10 in FIG. 1, and FIG. 6 is a plane view of a second top surface 32 of the antenna device 10 in FIG. 1.

The excitation component 40 is, for example, a copper foil, and is configured to excite the signals in the frequency band of WiFi 7 and Ku-band in 6G. The excitation component 40 is disposed on the first bottom surface 21, and includes a tuning fork-shaped excitation body 41, a bar-shaped excitation body 42 and two fence-shaped excitation bodies 43. The tuning fork-shaped excitation body 41 includes a handle portion 411 and a bifurcation portion 412. An end of the handle portion 411 is connected to a side of the bifurcation portion 412. Another end of the handle portion 411 has a feeding point 4111. The feeding point 4111 is configured for signals to be fed into the antenna device 10, and the signals are transmitted to the bifurcation portion 412 through the handle portion 411.

In detail, the bifurcation portion 412 includes a first excitation section 4121 and two second excitation sections 4122. The handle portion 411 is connected to a side of the first excitation section 4121. The second excitation sections 4122 are respectively connected to two opposite ends of the first excitation section 4121. The second excitation sections 4122 and the handle portion 411 are respectively located on different sides of the first excitation section 4121.

The bar-shaped excitation body 42 and the fence-shaped excitation bodies 43 are connected to a side of the first excitation section 4121 away from the handle portion 411. The first excitation section 4121 and the second excitation sections 4122 together surround the bar-shaped excitation body 42 and the fence-shaped excitation bodies 43. The bar-shaped excitation body 42 and the fence-shaped excitation bodies 43 are located between the second excitation sections 4122. The fence-shaped excitation bodies 43 are respectively located different sides of the bar-shaped excitation body 42. That is, the bar-shaped excitation body 42 is located between the fence-shaped excitation bodies 43.

In detail, each of the fence-shaped excitation bodies 43 includes a third excitation section 431 and a plurality of fourth excitation sections 432. The third excitation sections 431 of the fence-shaped excitation bodies 43 are connected to the first excitation section 4121. The second excitation sections 4122, the third excitation sections 431 of the fence-shaped excitation bodies 43 and the bar-shaped excitation body 42 are, for example, parallel to each other. The fourth excitation sections 432 are respectively connected to different sides of the third excitation sections 431 of the fence-shaped excitation bodies 43 in a corresponding manner. The fourth excitation sections 432 and the first excitation section 4121 are, for example, parallel to each other. A length of each of the third excitation sections 431 of the fence-shaped excitation bodies 43 and a length of the bar-shaped excitation body 42 are, for example, shorter than a length of each of the second excitation sections 4122.

The signal coupling component 50 is, for example, a copper foil. The signal coupling component 50 is disposed on the first top surface 22, and has a slot 51. The slot 51 is, for example, rectangular. The slot 51 is spaced apart from edges of the first substrate 20. The first excitation section 4121, the second excitation sections 4122, the bar-shaped excitation body 42 and the fence-shaped excitation bodies 43 correspond to, for example, the slot 51. The so-called "correspond to" refer that the first excitation section 4121, the second excitation sections 4122, the bar-shaped excitation body 42 and the fence-shaped excitation bodies 43 and the impedance matching component 80 overlap the slot 51 in a thickness direction of the antenna device 10.

The rectangular radiation components 60 are, for example, copper foils, and are, for example, square. The rectangular radiation components 60 are disposed on the second top surface 32, and are, for example, arranged in an array. The circular radiation components 70 are, for example, copper foils. The circular radiation components 70 are disposed on the second top surface 32, and are, for example, arranged in an array. The rectangular radiation components 60 surround the circular radiation components 70. After the signals are excited by the excitation component 40, the signals are coupled to the rectangular radiation components 60 and the circular radiation components 70 through the signal coupling component 50. Then, the signals are radiated outward through the rectangular radiation components 60 and the circular radiation components 70.

The impedance matching component 80 is, for example, a copper foil, and is, for example, dart-shaped. In detail, the impedance matching component 80 has a plurality of protrusions 81. An edge of the impedance matching component 80 line connecting any two adjacent protrusions 81 is a curved edge concave in a direction away from the adjacent one of the circular radiation components 70. The impedance matching component 80 is disposed on the second top surface 32. The circular radiation components 70 surround the impedance matching component 80. The circular radiation components 70 are spaced apart from the impedance matching component 80 by identical distances. Accordingly, the return loss of the antenna device 10 can be reduced so as to enhance the effect of impedance matching.

At least part of the bar-shaped excitation body 42 corresponds to the impedance matching component 80. The so-called "correspond to" refer that the at least part of the bar-shaped excitation body 42 overlaps the impedance matching component 80 in a thickness direction of the antenna device 10. In addition, a part of the fourth excitation sections 432 located closest to the first excitation section 4121 and another part of the fourth excitation sections 432 located farthest away from the first excitation section 4121 at least partially correspond to the circular radiation components 70.

In this embodiment, the bifurcation portion 412 surrounds the bar-shaped excitation body 42 and the fence-shaped excitation bodies 43, the fence-shaped excitation bodies 43 are respectively located on different sides of the bar-shaped excitation body 42, the rectangular radiation components 60 surround the circular radiation components 70, the circular radiation components 70 surround the impedance matching component 80, and the circular radiation components 70 are spaced apart from the impedance matching component 80 by identical distances, such that the antenna device 10 can have or correspond to a frequency band covering the frequency band of WiFi 7 and 6G, and the return loss of this frequency band can be reduced so as to meet communication requirements of WiFi 7 and 6G. Accordingly, the communication quality of the antenna device 10 in the frequency band of WiFi 7 and 6G technology can be improved.

In addition, at least part of the bar-shaped excitation body 42 corresponds to the impedance matching component 80, and a part of the fourth excitation sections 432 located closest to the first excitation section 4121 and another part of the fourth excitation sections 432 located farthest away from the first excitation section 4121 at least partially correspond to the circular radiation components 70, such that the antenna device 10 can be ensured to have or correspond to the frequency band covering the frequency band of WiFi 7 and 6G, and the return loss of this frequency band can be further reduced.

In this embodiment, a length L1 of the handle portion 411 is, for example, 14.5 millimeters. A width W1 of the handle portion 411 is, for example, 1.95 millimeters. A width W2 of the first excitation section 4121 is, for example, 3.225 millimeters. A length L3 of each of the second excitation sections 4122 is, for example, 11.975 millimeters. A width W3 of each of the second excitation sections 4122 is, for example, 2.5 millimeters. A width W4 of each of the third excitation sections 431 of the fence-shaped excitation bodies 43 and a width W5 of the bar-shaped excitation body 42 are, for example, 0.6 millimeters. A length L6 of each of the fourth excitation sections 432 is, for example, 2 millimeters.

In this embodiment, a length L7 of the slot 51 is, for example, 21 millimeters. A width W7 of the slot 51 is, for example, 16.5 millimeters. A distance D1 between a long side of the slot 51 and a side of the first substrate 20 adjacent to the long side of the slot 51 is, for example, 13 millimeters. A distance D2 between another long side of the slot 51 and a side of the first substrate 20 adjacent to another long side of the slot 51 is, for example, 14.5 millimeters.

In this embodiment, a length L8 of each of the rectangular radiation components 60 and a width W8 of each of the rectangular radiation components 60 are, for example, 7 millimeters. A distance D3 between any two adjacent rectangular radiation components 60 is, for example, 2 millimeters. A diameter R of each of the circular radiation components 70 is, for example, 7 millimeters. A distance D4 between any two adjacent circular radiation components 70 is, for example, 2 millimeters. A distance D5 between any one of the rectangular radiation components 60 and one of the circular radiation components 70 adjacent thereto is, for example, 2 millimeters.

In this embodiment, a distance D6 between any two opposite protrusions 81 are, for example, 2.75 millimeters. A distance D7 between each of the circular radiation components 70 and the impedance matching component 80 is, for example, 1.3 millimeters.

In this embodiment, the edge of the impedance matching component 80 connecting any two adjacent protrusions 81 is a curved edge concave in a direction away from the adjacent one of the circular radiation components 70, but the invention is not limited thereto. In other embodiments, the line connecting any two adjacent protrusions may be a straight edge. That is, the impedance matching component may be, for example, rhombus.

Figure 7:
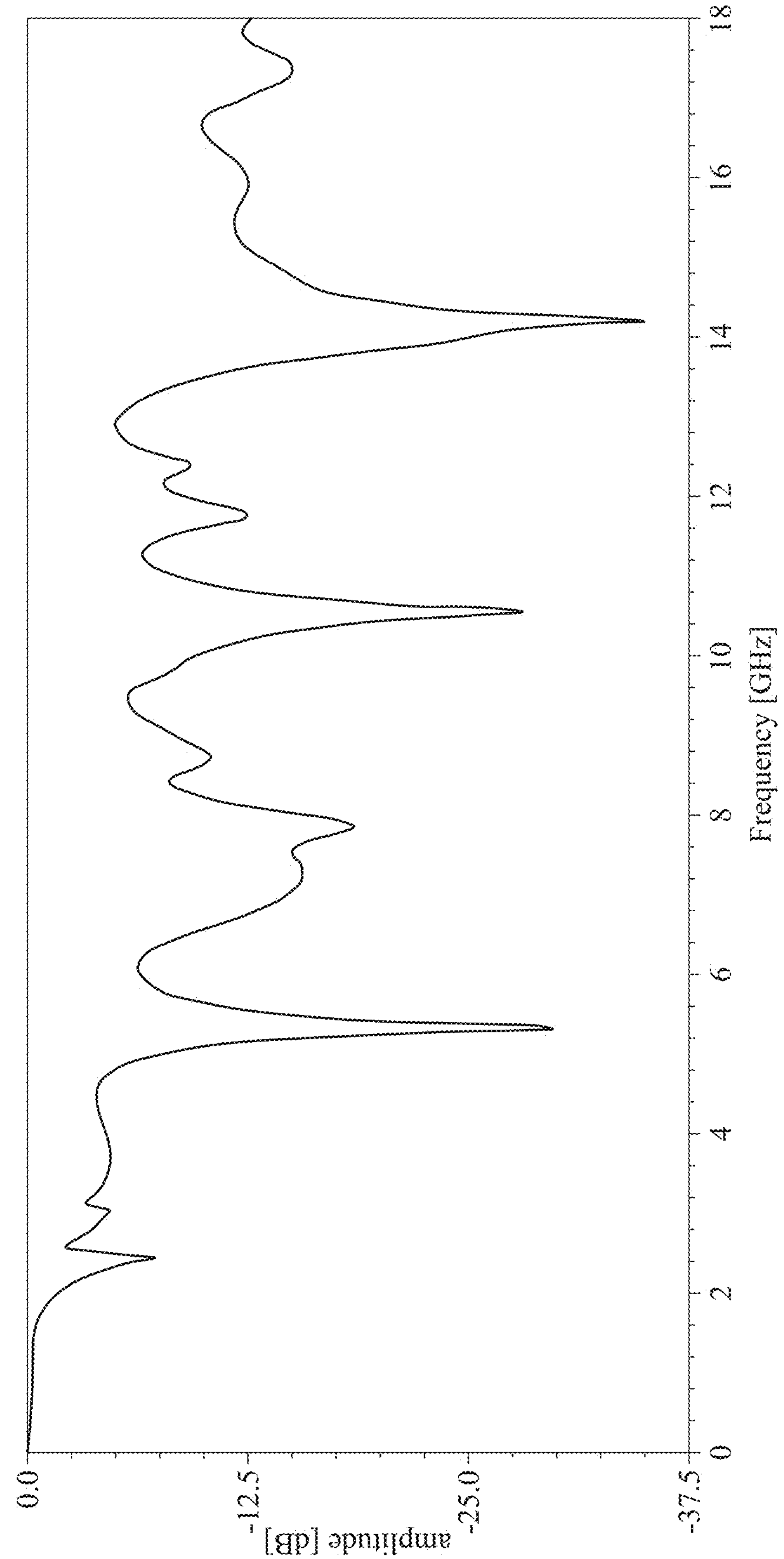
FIG. 7 is a graph showing a return loss of the antenna device in FIG. 1.

Please further refer to FIG. 7 together with FIG. 1 to FIG. 6, where FIG. 7 is a graph showing a return loss of the antenna device 10 in FIG. 1. In this embodiment, in the frequency band of WiFi 7 (including a frequency band ranging from 2.402 GHz to 2.494 GHz and a frequency band ranging from 5.03 GHz to 7.125 GHz) and the frequency band of Ku-band in 6G (ranging from 10.7 GHz to 18 GHz), the return loss of the antenna device 10 of this embodiment is slightly greater than −6 dB in a few frequency band. In the rest of the aforementioned frequency band, the return loss is less than −6 dB or even less than −10 dB. That is, the impedance matching of the antenna device 10 is good through the aforementioned structural design.

Generally, the higher the gain of the antenna is, the more concentrated the radiation from the antenna is, allowing the signal radiated from the antenna to be transmitted farther in a specific direction. In this embodiment, in the aforementioned frequency band, the antenna device 10, for example, has a gain of 3.59 dBi at a frequency of 2.4 GHz in the frequency band of WiFi 7, and has a gain of 4.44 dBi at a frequency of 15 GHz in the frequency band of Ku-band in 6G.

According to the antenna device disclosed in the above embodiment, the bifurcation portion surrounds the bar-shaped excitation body and the fence-shaped excitation bodies, the fence-shaped excitation bodies are respectively located on different sides of the bar-shaped excitation body, the rectangular radiation components surround the circular radiation components, the circular radiation components surround the impedance matching component, and the circular radiation components are spaced apart from the impedance matching component by identical distances, such that the antenna device can have or correspond to a frequency band covering the frequency band of WiFi 7 and 6G, and the return loss of this frequency band can be reduced so as to meet communication requirements of WiFi 7 and 6G. Accordingly, the communication quality of the antenna device in the frequency band of WiFi 7 and 6G technology can be improved.

In addition, at least part of the bar-shaped excitation body corresponds to the impedance matching component, and a part of the fourth excitation sections located closest to the first excitation section and another part of the fourth excitation sections located farthest away from the first excitation section at least partially correspond to the circular radiation components, such that the antenna device can be ensured to have or correspond to the frequency band covering the frequency band of WiFi 7 and 6G, and the return loss of this frequency band can be further reduced.

It will be apparent to those skilled in the art that various modifications and variations can be made to the invention. It is intended that the specification and examples be considered as exemplary embodiments only, with the scope of the invention being indicated by the following claims.

What is claimed is:

1. An antenna device, comprising:

a first substrate, having a first bottom surface and a first top surface facing away from each other;

a second substrate, stacked on the first substrate and having a second bottom surface and a second top surface facing away from each other, wherein the second bottom surface is connected to the first top surface;

an excitation component, disposed on the first bottom surface and comprising a tuning fork-shaped excitation body, a bar-shaped excitation body and two fence-shaped excitation bodies, wherein the tuning fork-shaped excitation body comprises a handle portion and a bifurcation portion, the handle portion is connected to a side of the bifurcation portion, the bar-shaped excitation body and the two fence-shaped excitation bodies are connected to a side of the bifurcation portion located away from the handle portion, the bifurcation portion surrounds the bar-shaped excitation body and the two fence-shaped excitation bodies, and the two fence-shaped excitation bodies are respectively located on different sides of the bar-shaped excitation body;

a plurality of rectangular radiation components, disposed on the second top surface and arranged in an array;

a plurality of circular radiation components, disposed on the second top surface and arranged in an array, wherein the plurality of rectangular radiation components surround the plurality of circular radiation components; and an impedance matching component, disposed on the second top surface, wherein the plurality of circular radiation components surround the impedance matching component, and the plurality of circular radiation components are spaced apart from the impedance matching component by identical distances.

2. The antenna device according to claim 1, wherein the bifurcation portion comprises a first excitation section and two second excitation sections, the handle portion is connected to a side of the first excitation, the two second excitation sections are respectively connected to two opposite ends of the first excitation, the two second excitation sections and the handle portion are respectively located on different sides of the first excitation section, the bar-shaped excitation body and the two fence-shaped excitation bodies are connected to the first excitation section, and the bar-shaped excitation body and the two fence-shaped excitation bodies are located between the two second excitation sections.

3. The antenna device according to claim 2, further comprising a signal coupling component, wherein the signal coupling component is disposed on the first top surface, the signal coupling component has a slot, the slot is spaced apart from edges of the first substrate, and the first excitation section, the two second excitation sections, the bar-shaped excitation body and the two fence-shaped excitation bodies correspond to the slot.

4. The antenna device according to claim 3, wherein the slot is rectangular, a length of the slot is 21 millimeters, a width of the slot is 16.5 millimeters, a distance between a long side of the slot and a side of the first substrate adjacent to the long side of the slot is 13 millimeters, and a distance between another long side of the slot and a side of the first substrate adjacent to the another long side of the slot is 14.5 millimeters.

5. The antenna device according to claim 2, wherein each of the two fence-shaped excitation bodies comprises a third excitation section and a plurality of fourth excitation sections, the third excitation sections of the two fence-shaped excitation bodies are connected to the first excitation section, the two second excitation sections, the third excitation sections of the two fence-shaped excitation bodies and the bar-shaped excitation body are parallel to each other, the plurality of fourth excitation sections are respectively connected to different sides of the third excitation sections of the two fence-shaped excitation bodies in a corresponding manner, the plurality of fourth excitation sections and the first excitation section are parallel to each other, at least part of the bar-shaped excitation body corresponds to the impedance matching component, and a part of the plurality of fourth excitation sections located closest to the first excitation section and another part of the plurality of fourth excitation sections located farthest away from the first excitation section at least partially correspond to the plurality of circular radiation components.

6. The antenna device according to claim 5, wherein a length of the handle portion is 14.5 millimeters, a width of the handle portion is 1.95 millimeters, a width of the first excitation section is 3.225 millimeters, a length of each of the two second excitation sections is 11.975 millimeters, a width of each of the two second excitation sections is 2.5 millimeters, a width of each of the third excitation sections of the two fence-shaped excitation bodies and a width of the bar-shaped excitation body are 0.6 millimeters, and a length of each of the plurality of fourth excitation sections is 2 millimeters.

7. The antenna device according to claim 1, wherein the impedance matching component has a plurality of protrusions, an edge of the impedance matching component connecting any adjacent two of the plurality of protrusions is a straight edge or a curved edge concave in a direction away from adjacent one of the plurality of circular radiation components, and a distance between any opposite two of the plurality of protrusions are 2.75 millimeters.

8. The antenna device according to claim 1, wherein a length of each of the plurality of rectangular radiation components and a width of each of the plurality of rectangular radiation components are 7 millimeters, and a distance between any adjacent two of the plurality of rectangular radiation components is 2 millimeters.

9. The antenna device according to claim 1, wherein a diameter of each of the plurality of circular radiation components is 7 millimeters, and a distance between any adjacent two of the plurality of circular radiation components is 2 millimeters.

10. The antenna device according to claim 1, wherein a distance between each of the plurality of circular radiation components and the impedance matching component is 1.3 millimeters.

* * * * *